United States Patent
Prickett et al.

(10) Patent No.: US 6,180,278 B1
(45) Date of Patent: Jan. 30, 2001

(54) RECLAMATION OF ACTIVE MATERIAL FROM METAL HYDRIDE ELECTROCHEMICAL CELLS

(75) Inventors: Orville G. Prickett, Gainesville; Robert Czajkowski, Melrose; Nelson C. Citta, Lake City; Michael R. Klein, Gainesvlle; E. Lee Huston, Gainesville, all of FL (US); Paul W. Galbraith, Ironton, MO (US)

(73) Assignee: Eveready Battery Company, Inc., St. Louis, MI (US)

( * ) Notice: Under 35 U.S.C. 154(b), the term of this patent shall be extended for 0 days.

(21) Appl. No.: 09/120,088

(22) Filed: Jul. 21, 1998

(51) Int. Cl.$^7$ ............... H01M 4/04; H01M 6/52
(52) U.S. Cl. .................................................. 429/49
(58) Field of Search ............... 429/49; 29/730, 29/731; 241/201, 270

(56) References Cited

U.S. PATENT DOCUMENTS

| | | | |
|---|---|---|---|
| 1,526,714 | * 12/1925 | Luthy | 429/49 |
| 1,563,506 | * 12/1925 | Luthy | 429/49 |
| 4,009,833 | 3/1977 | Litt et al. | |
| 5,377,920 | 1/1995 | Alavi et al. | |
| 5,478,664 | 12/1995 | Kaneko et al. | |
| 5,527,638 | 6/1996 | Kinoshita et al. | |
| 5,569,555 | * 10/1996 | Goldstein | 429/49 |
| 5,972,531 | * 10/1999 | Kawakami | 429/49 |

FOREIGN PATENT DOCUMENTS

| | | | |
|---|---|---|---|
| 2225699 | 6/1998 | (CA) | H01M/6/52 |
| T052567 | 7/1990 | (HU) | |
| 4-345754 | 12/1992 | (JP) | |
| 5-195007 | 8/1993 | (JP) | |
| 7-335276 | 12/1995 | (JP) | |
| 8-020825 | * 1/1996 | (JP) | |
| 8-115752 | 5/1996 | (JP) | |
| 9-071825 | 3/1997 | (JP) | |
| 9-082371 | 3/1997 | (JP) | |
| 10092417 | 4/1998 | (JP) | H01M/4/04 |
| 2089016 | * 8/1997 | (RU) | |
| WO 96/19840 | 6/1996 | (WO) | |

\* cited by examiner

Primary Examiner—Maria Nuzzolillo
Assistant Examiner—Mark Ruthkosky
(74) Attorney, Agent, or Firm—Linda Gebauer

(57) ABSTRACT

Methods are presented for reclaiming active material used in formation of secondary electrochemical cells and similar electrodes. Active materials such as nickel-metal hydride are removed from cell electrodes together with the binders used to secure the active materials to the electrode substrates. Because the binders and other agents are recovered without loss or degradation, the active materials may be easily and simply reconstituted and reused to form new electrodes. The methods are particularly applicable to electrodes fabricated by deposition of active material on flexible conductive substrates. The reclamation methods include mechanical separation, such as bending and ultrasonic beating, to remove the active materials without adding other chemical agents. The removed active materials are ground and sized. Solvent is added to dissolve binders and form a reconstituted active material paste. This paste may then be introduced to an electrode fabrication process in combination with, or in replace of, virgin paste. Devices are presented for the effective mechanical separation of active material from electrode substrates. One embodiment of these devices includes a pair of bending wheels which bend the electrodes repeatedly into a rough wave form. By bending the electrode repeatedly at adjacent locations, substantially all the active material and other constituents may be recovered. Bending at an angle smaller than a determined critical angle is required for effective separation and recovery.

20 Claims, 7 Drawing Sheets

RECLAMATION OF ACTIVE MATERIAL FROM METAL HYDRIDE ELECTROCHEMICAL CELLS

BACKGROUND OF THE INVENTION

The current invention is a process for recovering and reusing the active materials used in electrodes of electrochemical cells. In particular, the invention is a process and device for recovering the active materials deposited on flexible sheet electrode substrates. The process is directed primarily at recovering active material from scrap and trimmed electrode material resulting from the manufacture of cells.

Many secondary electrochemical cells are fabricated from two or more relatively flexible sheet electrodes separated by a nonconductive layer and wound in a spiral fashion into what is commonly known as a "jelly roll" configuration. They are then inserted into a container and surrounded by an electrolyte. Attaching electrical terminal connections to the partnered electrodes completes the cell. The individual electrodes are fabricated by depositing an electrochemically active material in a thin layer onto a current collector substrate. Example methods for completing this process for nickel-cadmium and nickel-metal hydride cells are provided in the U.S. Pat. Nos. to Rampel et al. (5,064,735), Pensabene et al. (5,466,546) and Kinoshita el al. (5,527,638). Typically, the active material is initially in a powdered form that is combined with solvents and other materials to form a paste. This paste is physically pressed or extruded onto the collector substrate. Other materials forming the paste include organic binders such as polyacrylates and copolymers added to improve adhesion. Both aqueous and nonaqueous binders are used in various electrode systems. Methods of forming electrodes using copolymer binders are provided in the patent to Kinoshita el al. Carbon or other additives may also be included to improve conduction or other electrochemical properties. In order to form the "jelly roll" configuration, the collector substrate is typically a thin flexible conductive sheet such as nickel plated steel that allows the significant bending required. Sheet electrodes often include a pattern of perforations over the effective area. Considerable effort has been expended in the technology to develop and maintain processes to deposit the active materials securely onto this flexible conductive sheet. During the winding operation, when the electrodes are rolled and flexed, the active material is subjected to impacts and strains that may disrupt it from the conductive sheet. In addition to maintaining physical attachment of the active material to the conductive substrate, electrical continuity must also be maintained. Consequently, electrodes are processed in a manner in which the active material is very fixedly attached to the sides of the conductive substrate. This is accomplished in part by using specific binders that hold the active material together and which in effect "glue" the active material in place onto the substrate. These binders are intermixed with the active material together with a solvent to form the active material paste. Deposition of the active material onto the electrode substrate is carried out in a variety of methods including extrusion and roll-coating. After this paste or slurry is deposited on the conductive sheet, the solvent is removed by drying. The solid binder remains to bind the active material tightly to the conductive sheet. At this stage the electrode may be pressed or calendered to compress the active material onto the substrate, increasing density and reducing the total thickness of the electrode. This calendering may also increase the adhesion of the active material and binder onto the substrate.

During fabrication of such electrochemical cells, scrap electrode material is often a byproduct. This may be in the form of strip scrap cut from continuous stock electrode to accomplish proper sizing of the finished electrode. Another source of scrap is electrodes damaged during processing or in some way not meeting quality or manufacturing standards. This scrap electrode material contains active material that in accumulation has considerable value but is typically discarded or lost when the scrap is sold or otherwise disposed of. To reduce the losses from scrapped active material, attempts have been made to recover and reuse the active material from scrap electrode stock and recovered used cells. Attempts to recover the active material are hindered by the very fact that the active material is intentionally affixed so well to the conductive substrate. The first step in recovering scrap active material is separation of the active material from the supporting electrode substrate. Due to the tenacious manner in which the active material is deposited, application of solvents alone is often insufficient to separate the active material from the substrate.

Several methods are known for recovery and reuse of specific active materials in some secondary cell processes. However, these focus on separation of the active material from the binder and other matrix constituents to bring the active material back to virgin condition. The separation processes used in these methods typically include chemical separation steps in which the binders are effectively washed out or otherwise lost. The recovered active material is then reprocessed at some point to reintroduce new binder material before it is deposited anew onto a current collector. The present methods have an added benefit in reduced chemical wastes reducing environmental impact. Because neither the binders, nor solvents used to dissolve binders, are removed from the process system, the problem of their disposal is eliminated.

In order to most efficiently reuse scrap active material, a process is needed for reclaiming active material from an electrode together with binders and other constituents and reusing this product directly in electrode fabrication. In this way, a greater proportion of the scrap may be saved and reused with a minimum of energy and material expenditure and environmental impact.

SUMMARY OF THE INVENTION

It is an object of the present invention to provide a method of separating active material from electrode substrates and reusing the active material to form new electrodes with a minimum of processing.

It is a further object of the present invention to provide a method of reclaiming active material from flexible electrode substrates by mechanical methods without using chemical separation.

It is a further object of the invention to provide a method of reusing reclaimed active material as a matrix in combination with intermixed binders without the need for separating the active material from the binders or other constituents of the matrix.

It is yet another object of the invention to provide a method of making electrodes in which active material is reclaimed from trimmed scrap electrode stock and reused to form new electrodes thereby reducing waste.

The present invention entails processes for the reclamation and reuse of active materials deposited on flexible electrode substrates. Active materials, as an active material matrix, are separated from electrode substrates by mechanical methods in order to retain the composition of the matrix. The diluting or composition altering effects of chemical separation methods are avoided by these methods. By maintaining the composition of the active material matrix, two objectives are accomplished: first, the value of otherwise lost matrix constituents is retained; and second, the active material matrix may be easily reused by reintroducing it to an electrode fabrication process. Preprocessing of the matrix before reuse is reduced.

A step in reclaiming active materials by the present inventive methods is separation and removal of active material matrix from an electrode substrate. One embodiment of the invention includes a mechanical separation device that uses a pair of bending wheels having interlocking teeth. These wheels are sized and configured to allow an electrode of particular dimensions to pass between the opposing teeth of the wheels, within an engagement gap. The interlocking teeth bend the electrode in a multiple of locations. The tooth shape and spacing result in forming bends with a radius less than a predetermined critical radius. At this critical radius, which is a function of the electrode materials and dimensions, the active material matrix begins to separate from the substrate. Separation is due to the stresses induced by the bending. The wheels are synchronized to maintain the engagement gap between the teeth. In distinct embodiments, the wheels are free-running or, alternatively, driven. Where continuous electrode strips are being worked, milling wheels having knurled faces are used to remove any remaining active material from the electrode substrate. The same bending wheels may be sized to accommodate continuous or piece electrode material of any dimension. The same methods of separation may be employed using other devices to bend electrodes along a multitude of nonparallel lines or circular bend lines. In separate configurations, the bending wheels are aligned for horizontal or vertical feed. In an alternative embodiment, active material is separated from electrode substrate by passing the electrode between the head and anvil of an ultrasonic beating device. This embodiment may also be used with either continuous or piece electrode scrap.

The reclaimed active matrix may be recombined as a powder with virgin powder prior to reuse. Because the active material matrix is completely recovered, its composition is substantially identical to virgin powder and may be combined without adjustment. Alternatively, the reclaim powder may be combined with a solvent to form a reclaim paste and deposited on electrode substrate to form new electrodes. Where the active material matrix includes a binder, the solvent is selected to dissolve the binder to form the paste. These processes are applicable to binders dissolving in nonaqueous and aqueous solvents. The reclaim paste may be also combined, in distinct embodiments, with virgin active material paste in any proportion prior to use in forming electrodes. A grinding and sizing step is included to reduce the size of the active material powder particles improving dissolution in the solvent.

Reclamation of active material is incorporated into a process for forming electrodes. A portion of scrap stock electrode is recovered after fabrication. This scrap portion may be the result of processing of the electrodes such as trim scrap or the result of quality or performance rejection of fabricated electrodes. The active material deposited on this scrap electrode is mechanically recovered and reformed into active material paste. New stock electrode is then fabricated with this paste. In this manner, the fabrication costs—material, environmental, and economic—are reduced. Positive and negative electrodes may be formed by these methods.

Because the separation process is mechanical, it is independent of the active matrix constituent chemistry. The invention includes processes for reclamation of active materials used in electrodes of nickel-cadmium, nickel-metal hydride, lithium ion and lithium metal secondary cells. The processes are similarly applied to electrodes of other cells designs and similar structures having deposited active materials on flexible substrates. Particular processes include bending of electrodes to a curvature less than a critical bend radius of 0.0625 inch (1.59 mm) along parallel bend lines no further than about 0.036 inches (0.91 mm) apart. The features of the inventive devices, products and methods are more clearly understood from the detailed examples provided in the following.

DESCRIPTION OF THE PREFERRED EMBODIMENTS

The present invention includes methods of recovering the active material deposited on electrodes. The present methods and devices are directed at electrodes constructed of an active material matrix affixed to a relatively flexible substrate. The active material is generally a matrix of electrochemically active agents and binders and performance enhancing agents. In order to recover the most value from scrap electrode stock or used electrodes, the active material must be separated from the underlying substrate by mechanical means. This allows the composition of the active material matrix to be retained and simplifies reintroducing the reclaimed active material matrix to the fabrication of new electrodes. The flow of scrap electrode stock in a commercial facility is typically inconsistent. If the separation process results in loss of any of the matrix constituents, then adjustment by adding the lost constituents must be made on an ongoing basis during reuse. By retaining the composition of the active material matrix, this reclaimed material may be added in any proportion to an existing stream of virgin matrix in an electrode manufacture process. "Virgin" as used herein refers to a material that has not previously been incorporated into a finished product such as an electrode.

Figure 1:
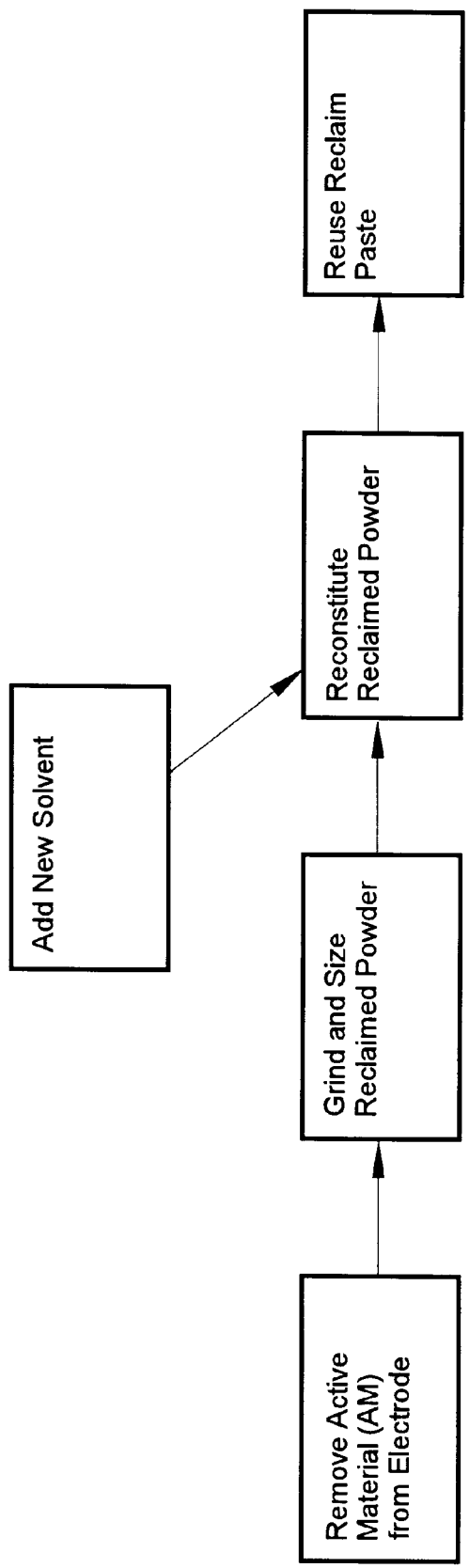
FIG. 1 is a general schematic of a reclamation process according to the invention.

FIG. 1 depicts the essential process steps of one embodiment of the present invention. The active material matrix is first removed from the electrode substrate by mechanical separation. The form of the active material after removal is typically large particles and flakes. This is ground and sized as necessary to assist dissolution of the binders to create a smooth paste. The resulting powder, which contains the active material as well as binder and all other constituents of the matrix, is then reconstituted back into a paste by addition of a solvent. The solvent dissolves the existing binder in the reclaimed powder to form the medium of the paste. This reclaim paste is then reused in place of virgin active material paste in an electrode fabrication process. Reconstitution of the reclaim powder into paste may occur at any time after the reclaim powder is produced. The reclaim powder may be stored in dry form and prepared as a paste as needed. The simplified storage and handling of dry reclaim powder is an additional benefit over other reclamation processes using wet chemical techniques.

To separate the active material from the electrode substrate it is necessary to break the bonds existing between the binder materials and the substrate. In the present invention this is accomplished by mechanical means. Mechanical separation enables recovery of the active material together with the binders and other constituents without dilution or loss. Attempting to separate the active material by dissolving the binder has been found to be particularly ineffective after electrodes have been calendered. Calendering consists of sizing by compressing the active material onto the substrate. After the active material on an electrode has been compressed, increasing the matrix density, solvents do not penetrate the matrix sufficiently to appreciably dissolve the binder attaching the matrix to the substrate. In one attempt at this process, chopped scrap electrode that had been calendered was introduced to a heated mixer with a quantity of solvent. After a period of time in the mixer, the scrap electrode pieces were observed and found to be little changed. The active material had not separated appreciably from the substrate.

Figure 2:
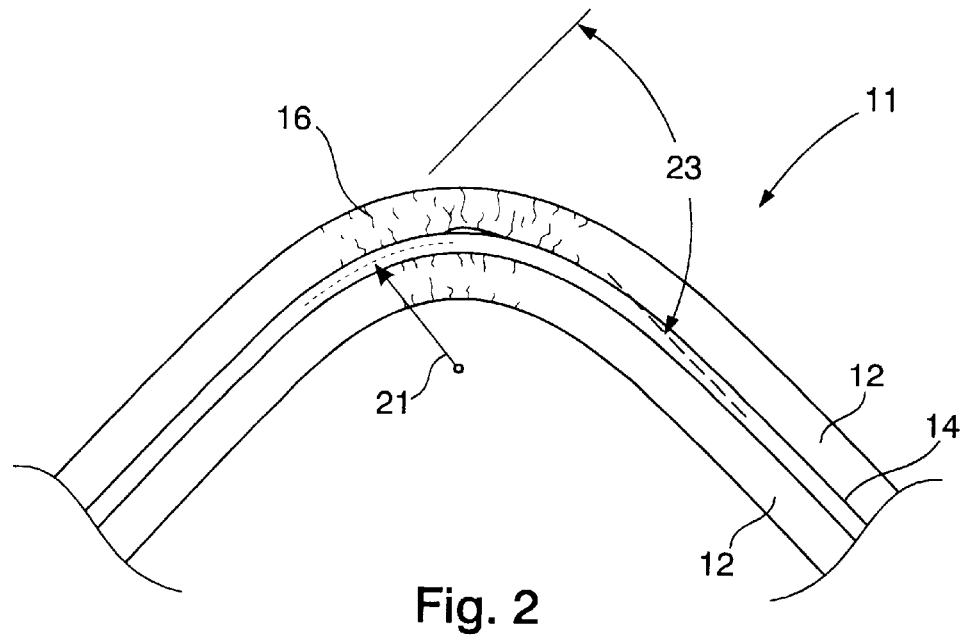
FIG. 2 depicts a cross section of an electrode as it is bent to separate the active material from the substrate.
Figure 3:
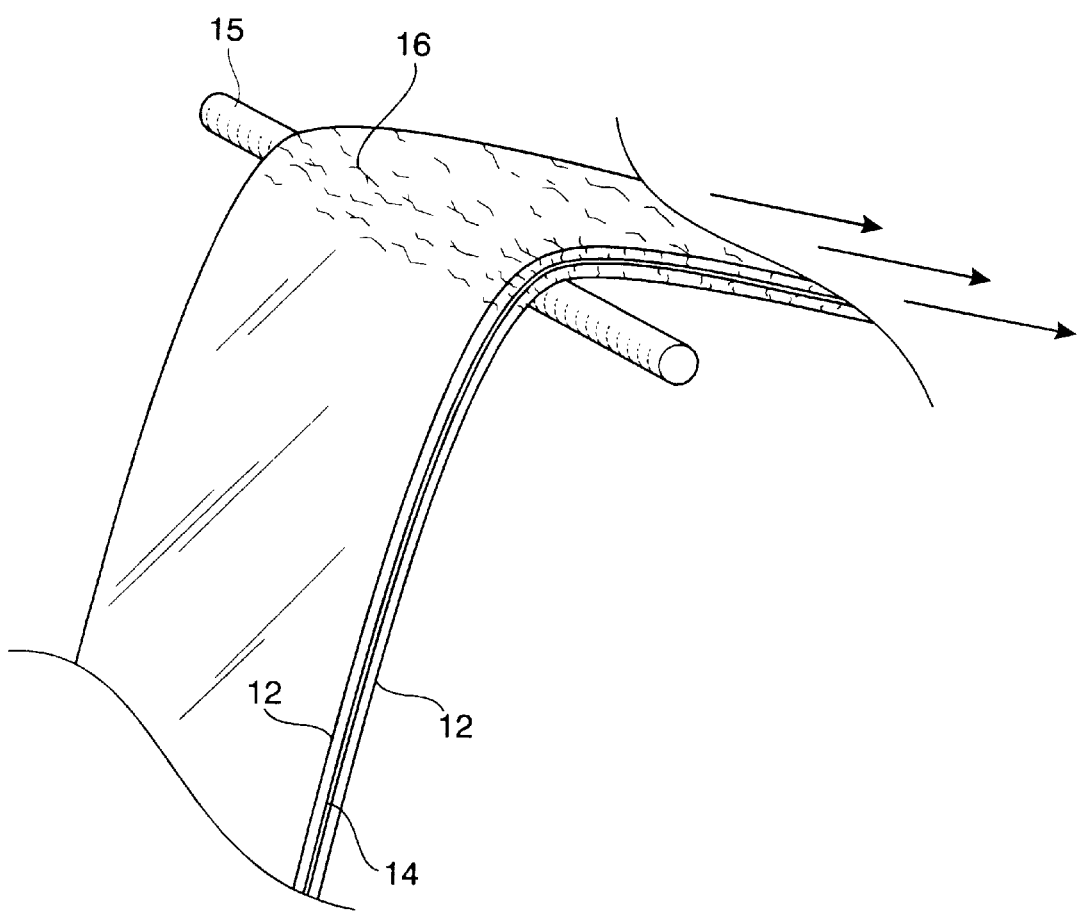
FIG. 3 depicts one method and device for bending electrodes to separate active material.

Mechanical separation in the form of bending or ultrasonic beating has successfully recovered active material on calendered electrodes. Despite the tenacious nature of binders, extreme bending of the electrode substrate will cause cracking and separation of the active material matrix from the substrate. FIG. 2 depicts a cross section of a portion of an electrode 11 that has been bent at a critical radius of curvature 21. As the electrode 11 is bent, the matrix of active material 12 on the outside and inside of the bend is subjected to tensile and compressive stresses. Shear stresses are induced at the junction of the active material 12 and substrate 14. At the point defining the critical radius 21, cracking 16 of the matrix begins due to these stresses. If the electrode is bent beyond the critical radius of curvature 21, the active material 12 cracks sufficiently to separate from the substrate 14. The critical radius to cause cracking 16 is dependent in part upon the thickness of the substrate 14 and active material 12 layers. It is also presumed that the electrode is bent through a significant bend angle 23—that is, no matter how small the radius of curvature, the electrode must be bent through sufficient bend angle 23 to induce stresses causing separation of the active material layers. This is dependent on the brittleness of the active material in the finished electrode and is easily determined through trial bending. Electrodes may be bent for this purpose by drawing over a bending corner or fixed radius. This may be performed at discreet positions along the electrode or continuously by drawing a length of electrode transversely over a radius. This bending radius may be in the form of the longitudinal surface of a rod 15, as shown in FIG. 3, having a radius slightly less than the critical radius. By drawing the entire electrode transversely over the rod 15, as shown, effectively all portions of the electrode are eventually subjected to bending at the critical radius and the active material separated.

To recover substantially all the active material on the electrode, it is necessary to cause bending over sufficient portions of the electrode such that cracking occurs over effectively the entire area of the electrode. It is not necessary to subject all portions of the electrode to bending, as cracking along the region of bending loosens adjacent active material as well. If the electrode is to be bent along spaced lines, the lines need only be sufficiently close that all the intervening active material is loosened. This is more clearly explained with respect to FIGS. 4 and 5.

Figure 4A:
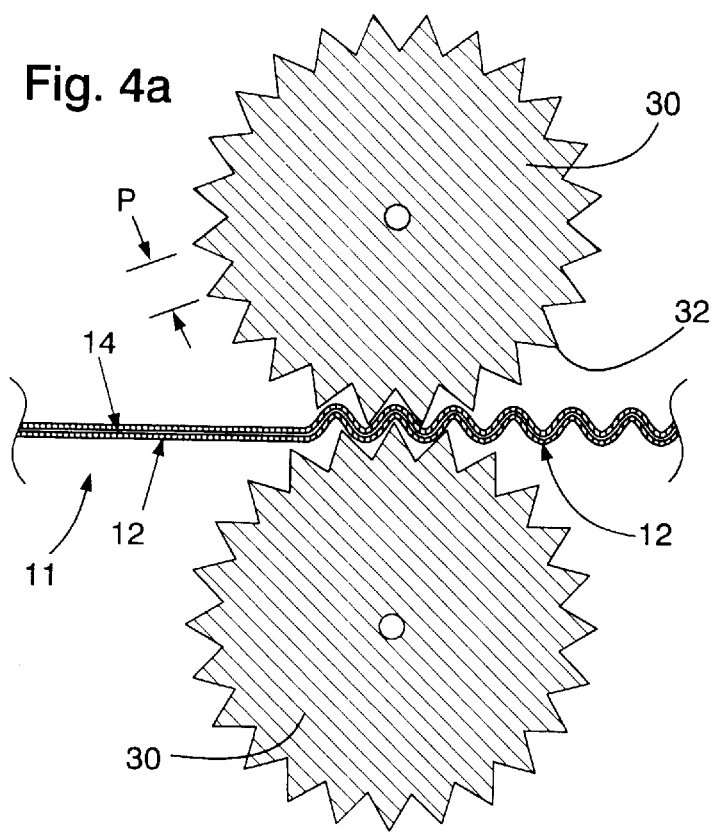
FIGS. 4a and 4b depict a device according to one embodiment of the invention for bending electrodes in which a pair of toothed wheels is employed.
Figure 4B:
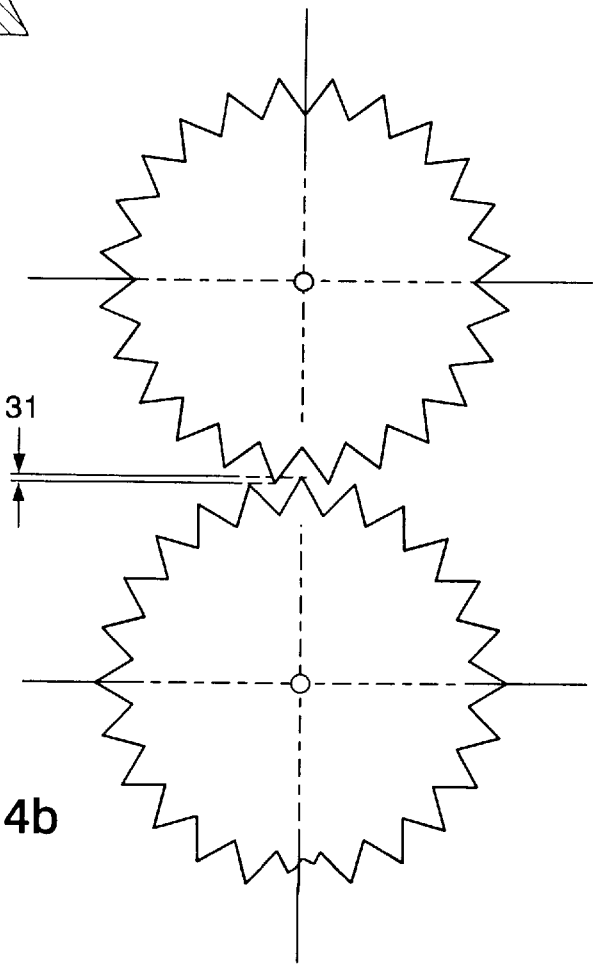
Figure 5:
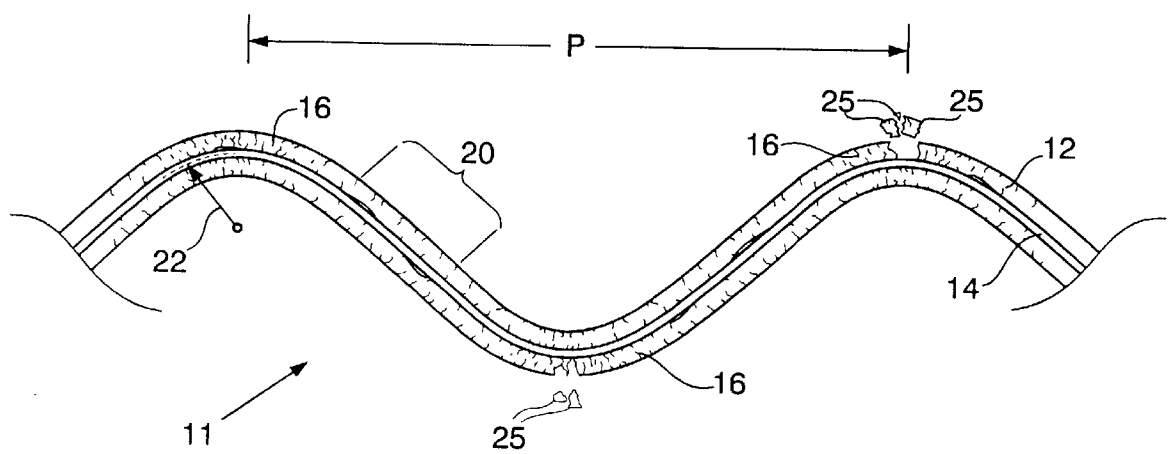
FIG. 5 depicts a cross section of an electrode that has been bent by a device such as that shown in FIG. 4.

FIG. 4 depicts one device for effectively bending electrodes to recover substantially all of the active material. A pair of toothed gear-like bending wheels 30 are engaged yet spaced apart such that their respective interlocking teeth 32 do not touch but form an intervening gap. The gap spacing between opposing teeth 32 is sufficient to allow a strip of electrode 11 to pass between the teeth 32. The wheels' rotation is driven by the electrode 11 as it is dragged through the wheels 30. The wheels 30 are free running but geared together to turn in a coordinated and synchronized fashion. Alternatively, the wheels 30 may be driven, drawing the electrode 11 through. The strip of electrode 11 is bent into roughly a wave shape by the interlocking teeth 32. This resulting electrode shape is typified by FIG. 5 that shows a cross section of an electrode 11 that has been bent into a wave shape. Each bend has a radius of curvature 22 somewhat less than the critical radius for the particular electrode. In this figure, the shape of the electrode is not sinusoidal. Rather, unbent straight leg portions 20 are interposed between each adjacent bent "crest" and "trough" of the wave. The length of these leg portions 20 need only be short enough that cracking 16 occurs over sufficient area of the electrode such that substantially all active material 12 is separated. The length of the leg portion 20 is a function of the pitch P of the wheels 30 and the engagement 31 of the opposing teeth 32 as well as the height and tip radius of each tooth. The exact overall resultant shape of the bent electrode is not by itself critical. What is necessary is that the cracking at adjacent bent regions extend sufficiently over the intervening unbent areas that substantially all the active material 12 separates from the substrate 14. This may be accomplished by many different combinations of bend radius and leg portion length. The shape shown is only one example. A portion 25 of the active material 12 is shown breaking from the electrode substrate 14.

Figure 6:
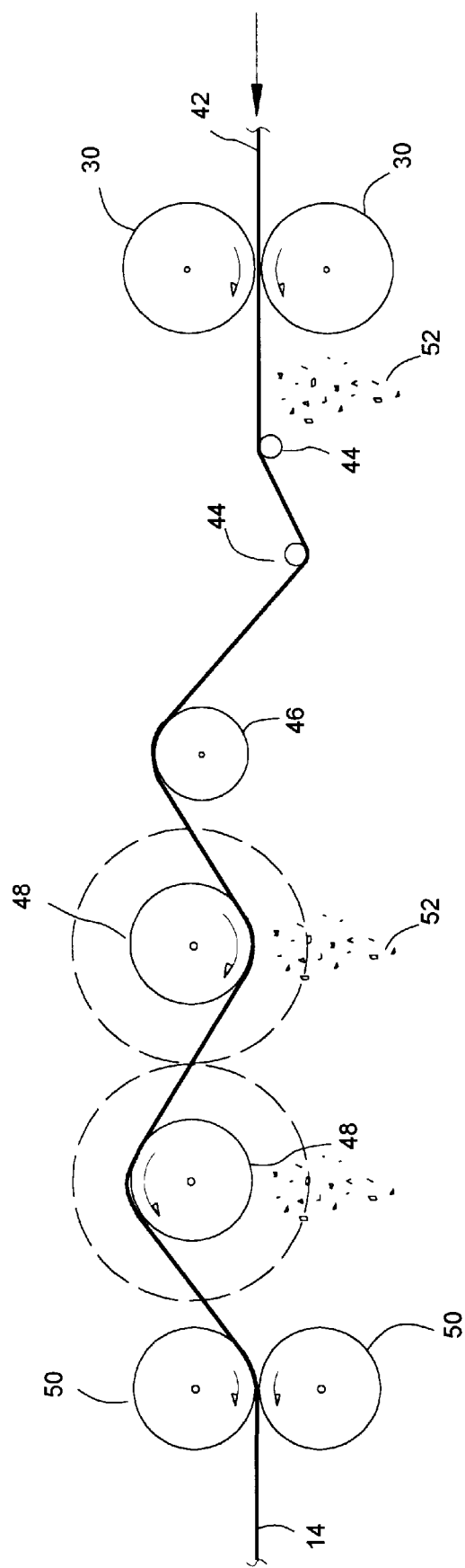
FIG. 6 depicts one embodiment of a system for bending and milling continuous strip electrode to separate and reclaim the active material.

FIG. 6 depicts the principal elements of one system using bending wheels as discussed above for removing active material from continuous strips of electrode. Several rotating elements are viewed along their longitudinal axes. A set of bending wheels 30 are allowed to run freely to match the feed rate of a strip electrode 42 as it is drawn through. Unbent continuous strip electrode 42 enters from one side of the bending wheels 30 and leaves with cracked and loosened active material. A device for catching falling material is preferably placed beneath the bending wheels 30 to capture a portion of the active material 52 that immediately falls away from the strip electrode 42. For simplicity, the wave shaped configuration of the bent strip is not shown in the figure. An idler knurl 46 and two control pins 44 aid in keeping the strip electrode 42 tight within the system. The pins 44 also act to wipe a portion of the cracked active material from the strip electrode 42 as it passes. The number and arrangement of the pins 44 may be changed to provide the proper tension and directional control desired in alternative configurations. Additional pins 44 are desired to increase tension when wide electrode stock is being worked. The continuous strip electrode 42 is drawn through a pair of milling knurls 48 at the feed rate by pulling knurls 50. The pulling knurls 50 are geared to the milling knurls 48 to overdrive the milling knurls 48 at a linear face speed greater than the strip electrode 42 feed rate. This provides a milling action that removes the remaining active material from the strip. The spin direction of the milling knurls 48 helps move the electrode strip 42 through the system and minimizes breakage. The active material is captured as it falls below the milling knurls 48. The two milling knurls 48 are positioned on opposite sides of the strip electrode 42 to address both sides. The faces of the pulling knurls 50 have knurling to provide sufficient friction against the electrode substrate. The manner of making and using such knurled wheels is known to those skilled in the art. Similarly, the circumferential faces of the milling knurls 48 have knurling to help scrub or mill the active material from the electrode substrate 14. The function of the milling wheels may be accomplished by other structures such as brushes. Due to the somewhat pyrophoric nature of many active materials such as metal hydride alloys, an inert gas cover is suggested. The elements described above may be formed of any of a variety of materials including stainless steels. Acceptable alternative materials will be obvious to those skilled in the art. A prototype system such as depicted in FIG. 6 was built. Table 1 below provides the essential parameters. The bending wheels used were manufactured with angled teeth, that is, having effectively a zero radius of curvature at the teeth tips. Continuous strip electrode was passed through this system—after which effectively no active material remained on the substrate. The electrode stock used for this test was formed of a perforated low carbon sheet steel substrate. After nickel plating, the substrate had a nominal thickness of 0.0024 inch (0.06 mm). A matrix containing a metal hydride based active material powder and a copolymer binder was deposited on both sides of the substrate to a finished nominal thickness ranging from 0.0105 to 0.0135 inch (0.267 to 0.343 mm). Experimenting by manual bending determined that the critical radius for this electrode configuration was approximately 1/16 inch (1.59 mm).

TABLE 1

Bending and Knurling System Parameters

| | |
|---|---|
| Bending Wheel Outside Diameter - inch (mm) | 1.36 (34.54) |
| Bending Wheel Pitch - teeth/inch (teeth/cm) | 14 (5.51) |
| Engagement of Opposing Teeth - inch (mm) | 0.003–0.005 (0.076–0.127) |
| Tooth Angle - degrees | 90 |
| Milling Knurls Speed - fraction of feed rate | 2.3 |
| Feed rate - ft/minute (m/s) | 40–80 (2–4) |
| Control Pin Diameter - inch (mm) | 0.125 (3.175) |

Within the scope of the invention, the relative positions of the various elements of this system are not fixed but are adapted in other embodiments to address practical considerations. In one alternative method of using the bending wheels described above, the pair of bending wheels 30 are oriented with their axes in a common horizontal plane such that the feed direction is from top to bottom. In this configuration, strip electrode or other scrap may be pre-chopped into short lengths and fed vertically into the bending wheels. For this, a vibration table or other device can be used to orient the chopped lengths to feed edgewise into the bending wheels. The chopped slit scrap falls naturally from beneath the bending wheels. After the active material matrix is cracked by the bending wheels, the chopped electrode pieces are loaded into a tumbler with a ceramic tumbling medium. The medium acts to scrub the active material matrix from the substrate. An inert gas cover is again suggested. After tumbling is completed, a vibrating screen is used to separate the medium, active material matrix and substrate pieces. In other embodiments, the electrode is bent along lines which are not parallel but have a mutual included angle. In yet other embodiments, the electrode is bent along nonlinear lines such as circular lines as might be produced by spherical impacting. In all these embodiments, portions of the electrode are bent to a radius of curvature less than a critical radius to cause substantial portions of the active material matrix to separate from the substrate.

Figure 7:
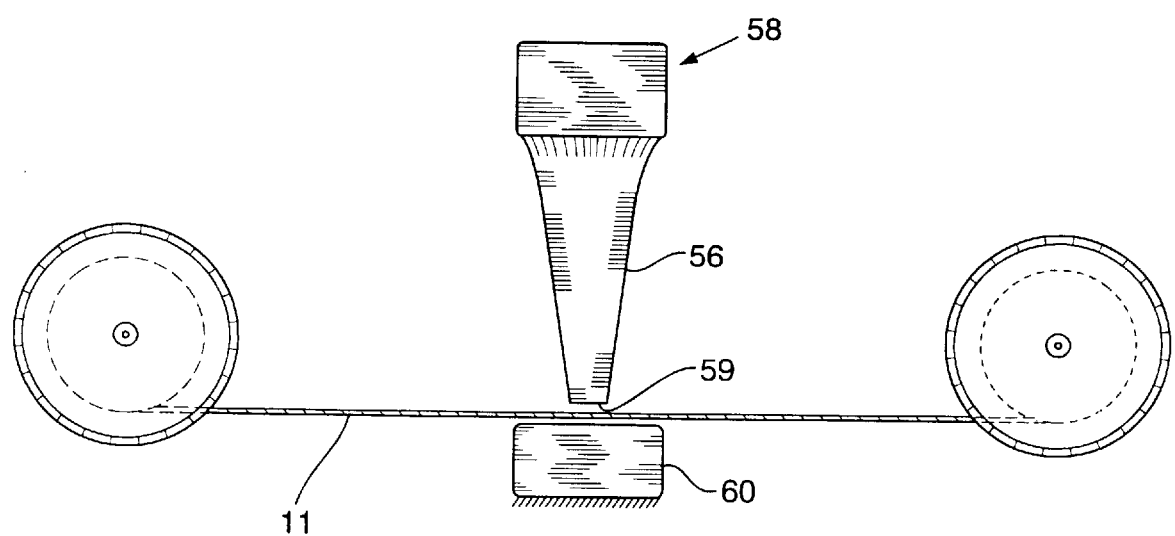
FIG. 7 shows a strip electrode being subjected to ultrasonic beating to remove active material.

An alternative method of mechanical separation is through ultrasonic beating. In this method, shown in FIG. 7, continuous (or chopped) electrode 11 is fed between the horn 56 and anvil 60 of a standard ultrasonic device 58. The beating of the horn face 59 breaks the active material matrix from the electrode substrate and the liberated matrix falls into a container. If the electrode is in chopped form, the chopped pieces must then be separated from the liberated matrix. This is easily completed by magnetic separation or use of a vibration table and screening.

Figure 8:
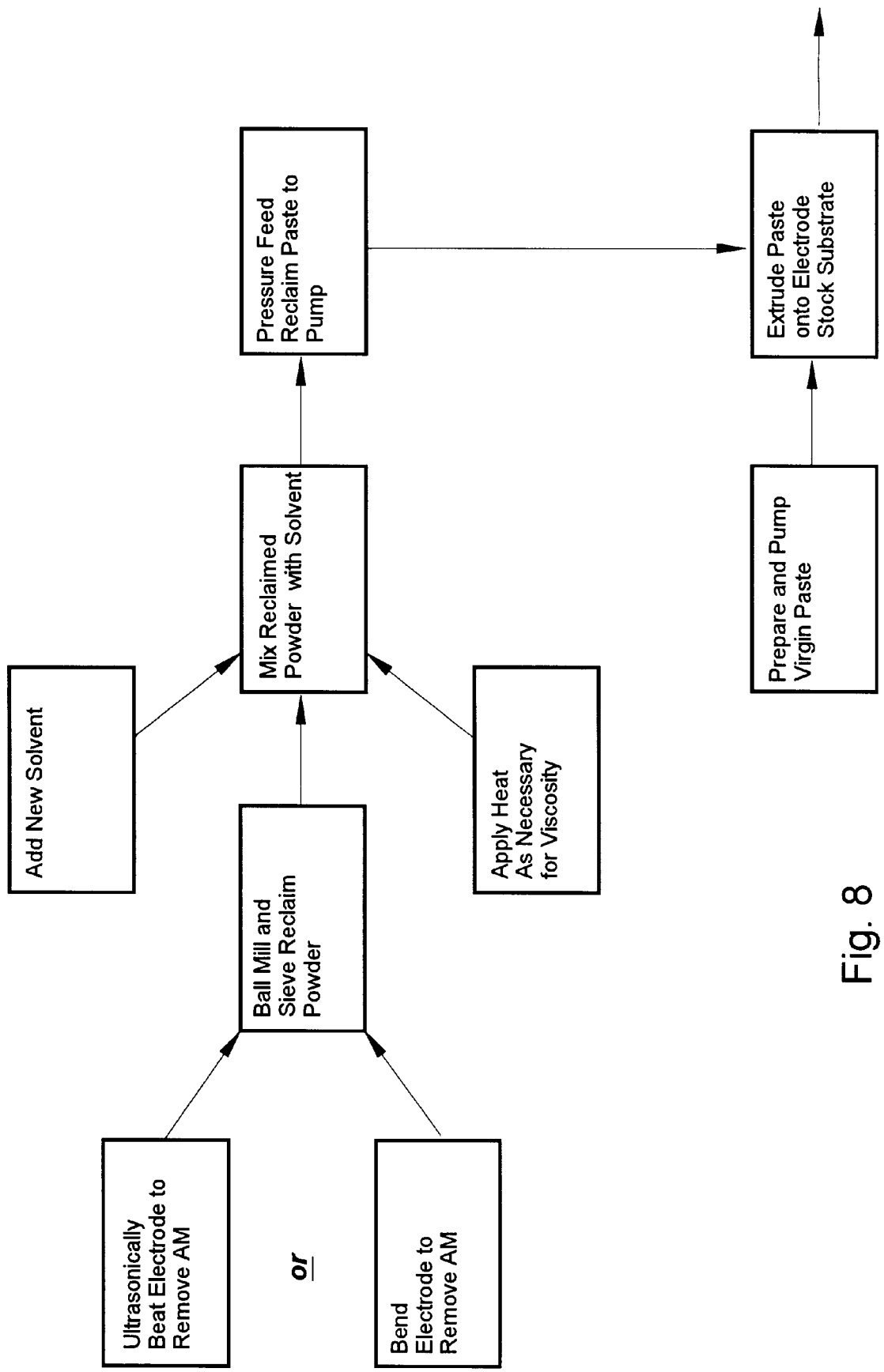
FIG. 8 is a schematic of a process for reclaiming and reusing active material to form new cell electrodes.

As previously discussed, an advantage of reclaiming active material together with the binders and other matrix constituents is the simplification of the process of reusing these materials. FIG. 8 is a schematic of one process flow for reclamation and reuse of active material. The first step is mechanical separation of the active material matrix from the scrap electrode stock. This may be performed by any of the methods previously discussed. After the active material matrix has been separated from the substrate, a solvent must be added to redissolve any existing binders and form a reclaim paste. However, because the dry reclaimed active material matrix is in the form of relatively large chips and flakes, dissolving the binders is an inefficient process. In a preliminary trial, hand mixing was found inadequate to fully dissolve the binder in flaked reclaim powder. A quantity of reclaim powder was then introduced to a heated mechanical mixer with solvent. After ½ hour of mixing, little change was noticed in the mixture. After 6½ hours of mixing, the resultant paste had a smooth feel to the hand but contained many large particles of undissolved reclaim powder. To improve efficiency and decrease the stirring times required to completely dissolve the binders, the active material matrix is preferably milled and sieved. This may be accomplished with a standard ball or roller mill or by dry mixing. Reducing particle size is also necessary in part to prevent the jamming in the mixing and extruding dies that may occur with larger particles. Size reduction to the original particle size is not necessary. Separation of metal particles by screening or magnetic separation is also preferably accomplished at this point as metal particles may be broken from the electrode substrate during the bending and ultrasonic operations. After separation and sizing, the reclaim powder is introduced to a mechanical mixer with a quantity of solvent and mixed to form a uniform paste matching the characteristics of virgin paste. Heat is applied to the paste as necessary to improve viscosity. The paste is then introduced to an electrode fabrication process in the same manner as virgin paste. The ongoing virgin paste stream need not be adjusted to maintain composition. The paste is pressure fed to a pump that in turn feeds a die extruder. Within the extruder, the virgin paste and reintroduced reclaim paste are intermixed and then extruded onto electrode substrate. By introducing the reclaim paste in a path parallel to the virgin paste path, the reclaim paste may be added in the time and quantity available. The only adjustment necessary is the virgin paste feed rate. When no reclaim paste is available, the fabrication process proceeds using 100% virgin paste. In an alternative reclamation and reuse process, the reclaim powder, including binders and other constituents, is mixed with virgin powder. This combined powder is then used to form a paste and deposited on a substrate. Other alternative reuse processes are possible which gain the benefits of the reclamation methods provided here.

EXAMPLE

Nickel MH Test Cells

To investigate the reclamation and reuse of active materials, a quantity of scrap electrode was obtained from a process line manufacturing nickel-metal hydride cells. The scrap was in the form of a continuous strip that had been trimmed from processed electrode to obtain a desired width. The substrate used in this scrap was a perforated low carbon sheet steel of nominal thickness of 0.0021 inch (0.053 mm) and plated on both sides with 0.000140 inch (0.0035 mm) of nickel. The active material matrix was a nickel-metal hydride powder which was combined with carbon and a copolymer binder to form the active material matrix. In order to form a paste for depositing on the electrode substrate, the active material matrix powder was combined with a Stoddard type aliphatic solvent. Proper viscosity was controlled by solvent content and temperature of the paste. After extrusion of the paste onto the electrode, the solvent was allowed to fully dry from the paste. The final dry thickness was obtained by calendering the electrode between rollers. After deposition, drying and calendering of the active material on both sides of the substrate, the total nominal thickness of the finished electrode was 0.0135 inch (0.343 mm). It was at this point that this electrode stock was sized by cutting the strip scrap from the edges of the electrode stock. The scrap strip was approximately one quarter inch (6.3 mm) in width. The active material and binders from this strip scrap were reclaimed by ultrasonic beating as described above. The resulting powder was ball milled to less than 500 microns and mixed with solvent to form an acceptable paste. This reclaim paste was introduced into a production extruder and deposited on electrode substrate. The electrode plate fabricated was indistinguishable by observation and feel from standard production electrode plate. The performance of electrodes and cells fabricated with this reclaim paste was determined by fabrication of test cells. Metal hydride electrodes, with 100%, 25%, 10% and 0% reclaim paste were also produced in a laboratory. The electrodes were then used to fabricate 1100 mAh (milliamp hour) "AA" size cells and, using the 0% reclaim (100% virgin production paste) as a control, these cells were compared in performance and life tests. In an Initial Performance test, measuring capacity against discharge rate, the reclaim paste cells performed at least as well as the controls. This is shown in Table 2 where "C" is the discharge rate in amperes required for full discharge in one hour. Similarly, measured Re (effective resistance) values were essentially alike in all groups. In a Life Test all cells were repeatedly cycled at "C" rate and the capacity measured. All groups reached 500 life cycles. The results of this test over various cycles is given in Table 3 below. Except for the 100% reclaim paste cells, cells with reclaim as a paste constituent performed as well as the control cells through 500 cycles. Sub "C" (Cs) size cells were also fabricated with 25% and 0% reclaim paste and subjected to a high rate discharge test. All cells tested provided the minimum capacity required for the use of this ell configuration. Specific results of this test are not shown herein.

TABLE 2

Initial Performance Test
(Capacity, Ah at the specified Discharge rate over 8 cycles)

| Cycle | Discharge Rate | 0% Reclaim | 10% Reclaim | 25% Reclaim | 100% Reclaim |
|---|---|---|---|---|---|
| 1 | C | 0.909 | 0.967 | 0.959 | 0.954 |
| 2 | C | 1.004 | 1.054 | 1.039 | 1.051 |
| 3 | * | * | * | * | * |
| 4 | C/5 | 1.075 | 1.122 | 1.111 | 1.118 |
| 5 | C | 1.045 | 1.092 | 1.074 | 1.085 |
| 6 | 2C | 1.011 | 1.057 | 1.029 | 1.046 |
| 7 | 3C | 0.983 | 1.032 | 0.992 | 1.018 |
| 8 | C | 1.015 | 1.06 | 1.036 | 1.05 |

TABLE 3

Life Test
(Capacity, Ah)

| Cycle | 0% Reclaim | 10% Reclaim | 25% Reclaim | 100% Reclaim |
|---|---|---|---|---|
| 1 | 0.944 | 0.946 | 0.932 | 0.950 |
| 5 | 1.058 | 1.057 | 1.044 | 1.081 |
| 10 | 1.050 | 1.052 | 1.033 | 1.071 |
| 20 | 1.063 | 1.064 | 1.042 | 1.084 |
| 50 | 1.093 | 1.090 | 1.081 | 1.118 |
| 100 | 1.136 | 1.132 | 1.133 | 1.164 |
| 200 | 1.167 | 1.164 | 1.165 | 1.186 |
| 500 | 1.058 | 1.021 | 1.078 | 0.867 |

The present methods may be applied to electrodes using other active materials and other binder systems or having other geometric parameters such as active material layer thickness. While examples used herein have used electrodes with active material deposited on two sides, the same methods may be employed on one-sided electrodes. The same structure of a deposited matrix on a sheet substrate is used in other electronic components such as capacitors. Where recovery of active materials from such component substrates is desired, these methods of separation and reclamation may be likewise employed. The bending parameters are partly dependent, as with electrochemical cell electrodes, upon the binder materials and other constituents. More brittle active material layers, using less flexible binders, will generally not require as small a radius of bending as determined in the examples above. Determining the proper bend radius requires trial bending at various angles and observing the resultant cracking and separation. A "flexible" electrode as described here is one having sufficient flexibility and resiliency to be bent sufficient to crack and separate the attached active materials without itself being first broken. A higher degree of resiliency may be required of an electrode material used in a continuous strip bending operation than where chopped or cut electrodes are being worked. These methods of separation and reclamation may also be applied to systems using water-based binders or no binders at all. Additional advantages exist for reclaiming active materials in combination with aqueous binders. Minimizing water contact time is generally desired with these systems. By recovering the active material matrix and then dissolving the aqueous binders just prior to use and mixing with virgin paste, water contact time is reduced. Where the active material matrix includes no binders, the separation methods are still valuable to recover the active materials and other constituents.

Although the above examples have demonstrated that reclaimed active material matrix may be reused to make up 100 percent of a process paste to form electrodes, a preferred composition is 10 to 25 percent reclaim active material matrix powder or paste in combination with virgin active material matrix powder or paste. The discussed mechanical methods of separating active material are preferably used in conjunction with recovery and reuse of the binders. However, where final separation and recovery of active material separate from intermixed binders or other constituents is desired, the same techniques may be employed as a first step. The above examples are intended only to illustrate the inventive elements of the claimed invention. These same novel features may be incorporated in other embodiments by one skilled in the art using existing and future materials and devices. The scope of the invention is defined solely by the below claims.

We claim:

1. A method of reclaiming active material from metal hydride electrodes formed of a virgin active material matrix deposited upon a conductive substrate and calendared to a thickness, wherein active material is recovered for reuse together with the remaining constituents of the matrix, the method comprising:

a. mechanically separating a virgin active material matrix from a substrate of a metal hydride electrode to form a reclaim powder by bending the electrode at a sufficiently small bend radius to cause the active material matrix to crack and separate from the electrode substrate b. adding solvent to the reclaim powder to form a reclaim paste.

2. The method of claim 1 wherein bending the electrode comprises:

bending an electrode at a plurality of adjacent locations sufficiently proximate to each other to cause substantially all the active material matrix to be separated from the substrate.

3. The method of claim 2 wherein:

the plurality of adjacent locations are a plurality of mutually parallel lines.

4. The method of claim 3, wherein the act of bending further comprises:

bending the electrode at each location to a radius of curvature of less than about 1/16 inch.

5. The method of claim 4, wherein:

the parallel lines are each no further than about 0.036 inches distant from an adjacent line.

6. The method of claim 1, wherein adding solvent comprises:

adding solvent in a predetermined proportion to the reclaim powder and dissolving a binder intermixed with the active material to form a reclaim paste having a composition effectively identical to the virgin active material.

7. The method of claim 6, wherein the solvent is non-aqueous.

8. The method of claim 7, further comprising:

combining the reclaim paste with a virgin active material matrix paste to form a process paste, and depositing the process paste onto a conductive substrate to form an electrode.

9. A method of forming metal hydride electrodes for use in secondary cells in which active material from metal hydride electrodes previously formed of an active material matrix deposited on a substrate and calendared to a thickness may be recovered and reused, together with all other matrix constituents, to form the new electrodes, the method comprising:

a. depositing a virgin matrix paste onto a flexible conductive substrate and calendaring to a thickness to form a first stock metal hydride electrode;

b. recovering at least a portion of the first stock electrode;

c. mechanically recovering substantially all the active material from the recovered portion of electrode together with substantially all other matrix constituents to form a reclaim powder by bending the electrode at a sufficiently small bend radius to cause the active material matrix to crack and separate from the electrode substrate;

d. forming a reclaim paste by adding a solvent to the reclaim powder; and e. depositing the reclaim paste onto a flexible conductive substrate to form a second stock metal hydride electrode.

10. The method of claim 9, further comprising:

combining the reclaim powder with virgin active material matrix powder prior to forming a reclaim paste; and wherein adding a solvent also comprises adding a solvent simultaneously to the combined virgin active material matrix powder.

11. The method of claim 10, wherein the act of mechanical recovery comprises:

bending the recovered portion to crack and separate substantially all the active material, together with all intermixed constituents, from the substrate to form a reclaim powder; and milling the reclaim powder to reduce particle size.

12. The method of claim 9, further comprising:

combining the reclaim paste with additional virgin active material matrix paste.

13. The method of claim 12, wherein:

the combined paste contains from 10 to 25 percent reclaim paste.

14. A device for recovering substantially all of an active material matrix from flexible electrode substrates of metal hydride electrodes without requiring the dissolution of securing binders comprising:

a first and second bending wheel, both having a plurality of bending teeth, each of the plurality of teeth having a tip radius smaller than a critical radius defined as the radius sufficient to initiate cracking of the active material matrix, and the first wheel being positioned with respect to the second wheel such as to engage their respective teeth while forming an engagement gap of a height sufficient to allow a sheet of said electrode to pass between said wheels; and such that sheet electrode may pass between the wheels, through the gap, and be bent in a plurality of locations to a bend radius less than the critical radius thereby cracking and separating active material disposed on the electrode.

15. The device according to claim 14, further comprising:

a synchronizing means for synchronizing the rotation of the first bending wheel with respect to the second bending wheel such as to maintain the engagement gap.

16. The device according to claim 15, further comprising:

at least one milling wheel, the milling wheel having knurls on a circumferential face;

means for moving a continuous electrode at a feed rate through the gap and against the milling wheel face;

means for rotating the milling wheels at a face speed greater than the electrode feed rate;

such that the active material on the electrode will be milled off by the rotating milling wheels.

17. An electrochemical cell electrode formed by the process of claims 9 or 10.

18. An electrochemical cell electrode according to claim 17, and comprising from 10% to 25% reclaim paste.

19. An electrochemical cell electrode according to claim 18, wherein:

the electrode comprises a negative electrode.

20. An electrochemical cell wherein the improvement comprises electrodes according to claim 18.

* * * * *